United States Patent
Koch et al.

(10) Patent No.: US 9,688,147 B1
(45) Date of Patent: Jun. 27, 2017

(54) VEHICLE INSTRUMENT CLUSTER WITH HIDDEN SPEAKER

(71) Applicants: Denso International America, Inc., Southfield, MI (US); DENSO CORPORATION, Kariya, Aichi-pref. (JP)

(72) Inventors: Michael Koch, New Hudson, MI (US); Ryo Kunitachi, Novi, MI (US); Brandon Peterson, Farmington Hills, MI (US); Joseph Falzon, Livonia, MI (US); Amol Deshmukh, Canton, MI (US)

(73) Assignees: Denso International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/008,886

(22) Filed: Jan. 28, 2016

(51) Int. Cl.
| | |
|---|---|
| *B60K 37/04* | (2006.01) |
| *B60R 11/02* | (2006.01) |
| *H04R 1/34* | (2006.01) |
| *H04R 1/02* | (2006.01) |

(52) U.S. Cl.
CPC .......... *B60K 37/04* (2013.01); *B60R 11/0217* (2013.01); *H04R 1/023* (2013.01); *H04R 1/028* (2013.01); *H04R 1/345* (2013.01); *B60K 2350/1056* (2013.01); *H04R 2499/13* (2013.01)

(58) Field of Classification Search
CPC .. B60R 11/0247; B60R 11/0217; B60K 37/02
USPC .......................... 381/389; 296/70; 340/425.5
See application file for complete search history.

(56) References Cited

U.S. PATENT DOCUMENTS

| | | | |
|---|---|---|---|
| 6,021,208 A | 2/2000 | Kin-Lung | |
| 6,305,732 B1 * | 10/2001 | Ruhl | B60R 11/0247 296/70 |
| 2009/0003642 A1 * | 1/2009 | Hagedorn-Maillard | B60R 11/0217 381/389 |
| 2009/0174533 A1 * | 7/2009 | Bowden | B60K 37/02 340/425.5 |

FOREIGN PATENT DOCUMENTS

| | | |
|---|---|---|
| JP | 4491723 B2 | 6/2010 |
| JP | 5775405 B2 | 9/2015 |

* cited by examiner

*Primary Examiner* — Mohammad Islam
(74) *Attorney, Agent, or Firm* — Harness, Dickey & Pierce, P.L.C.

(57) ABSTRACT

An instrument cluster assembly is provided and includes a case assembly having a visor attached to a front side of the case assembly, the visor having at least one sound hole. The instrument cluster assembly also includes a dial sheet having at least one indicator. The instrument cluster assembly also includes a lens mounted to the visor such that the at least one indicator of the dial sheet is viewable through the lens. The instrument cluster assembly also includes a speaker that generates sound waves and a sound tube that directs the sound waves from the speaker to the at least one sound hole of the visor such that the sound waves generated by the speaker travel through the sound tube and exit the at least one sound hole of the visor without traveling through the dial sheet and the lens.

8 Claims, 2 Drawing Sheets

VEHICLE INSTRUMENT CLUSTER WITH HIDDEN SPEAKER

FIELD

The present disclosure relates to vehicle instrument clusters and, more specifically, to vehicle instrument clusters with hidden speakers.

BACKGROUND

This section provides background information related to the present disclosure, and is not necessarily prior art.

It is becoming increasingly common for vehicle instrument cluster assemblies in a subject vehicle to include a speaker that provides audible alerts and audible feedback to an operator of the subject vehicle. For example, the speaker may output a ticking sound when a turn signal of the vehicle is activated. Additionally, the speaker may output an audible alert, such as a chime or buzzing sound, when another vehicle is located within a blind spot of the subject vehicle. Additionally, the speaker may output an audible alert when the subject vehicle is in reverse and an object is detected by a backup camera system of the subject vehicle.

With reference to FIG. 3, a cross section of a conventional meter or instrument cluster assembly is shown and includes a mask or visor 12, a lens 14 (such as an acrylic lens), an applique or dial sheet 24, and a printed circuit board (PCB) 26. The conventional instrument cluster assembly may also include a speaker 28 and a resonance chamber 30 formed by or with a rear cover and/or a housing or case assembly of the instrument cluster assembly. As shown in FIG. 3, the instrument cluster assembly may be installed within an instrument panel of a vehicle such that a bezel 32 of the instrument panel overlaps the lens 14 of the instrument cluster assembly and the exterior of the visor 12 is hidden from view.

As shown in FIG. 3, the speaker 28 may be located behind the PCB 26 and aligned with an aperture in the PCB 26. In the conventional instrument cluster assembly, as shown in FIG. 3, sound waves from the speaker 28 must travel through multiple layers and structures within the instrument cluster assembly before reaching the operator of the subject vehicle. For example, in the conventional instrument cluster assembly, sound waves from the speaker 28 must travel through any graphics display structures, such as a thin-film-transistor (TFT) liquid-crystal display (LCD) screen, that may be mounted to the PCB 26 or located between the PCB 26 and the dial sheet 24. Further, in the conventional instrument cluster assembly, sound waves from the speaker 28 must also travel through the dial sheet 24 and the lens 14 of the instrument cluster assembly before reaching the operator of the subject vehicle. As such, sound waves outputted by the speaker 28 may be attenuated by dampening, muting, and muffling due to the internal structures of the instrument cluster assembly before reaching the operator of the vehicle. As such, the speaker 28 may be required to operate at an increased volume to offset the attenuation caused by the internal structures of the conventional instrument cluster assembly. The sound waves from the speaker, however, cannot be so loud as to impact the appearance of any indicators or displays of the conventional instrument cluster assembly, including any indicators located on the dial sheet 24.

While such conventional instrument cluster assemblies are suitable for their intended use, they are subject to improvement. For example, it would be desirable to have an improved instrument cluster assembly with a hidden speaker that is less susceptible to sound attenuation by dampening, muting, and muffling caused by the internal structures of the instrument cluster assembly.

SUMMARY

This section provides a general summary of the disclosure, and is not a comprehensive disclosure of its full scope or all of its features.

The present teachings provide for an instrument cluster assembly that includes a case assembly having a visor attached to a front side of the case assembly, the visor having at least one sound hole. The instrument cluster assembly also includes a dial sheet having at least one indicator. The instrument cluster assembly also includes a lens mounted to the visor such that the at least one indicator of the dial sheet is viewable through the lens. The instrument cluster assembly also includes a speaker that generates sound waves and a sound tube that directs the sound waves from the speaker to the at least one sound hole of the visor such that the sound waves generated by the speaker travel through the sound tube and exit the at least one sound hole of the visor without traveling through the dial sheet and the lens.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
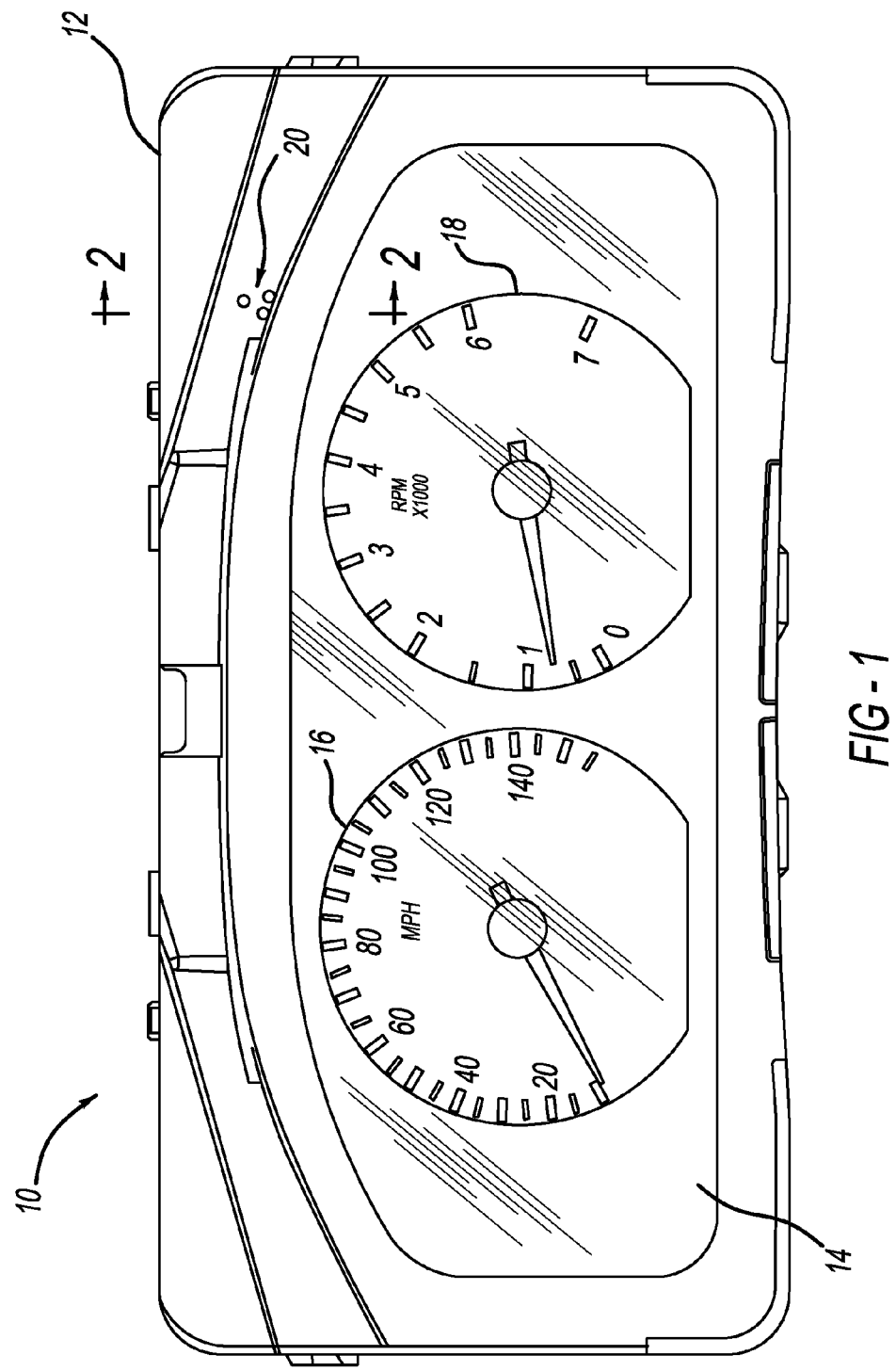
FIG. 1 is a perspective view of an exemplary instrument cluster assembly according to the present teachings.
Figure 2:
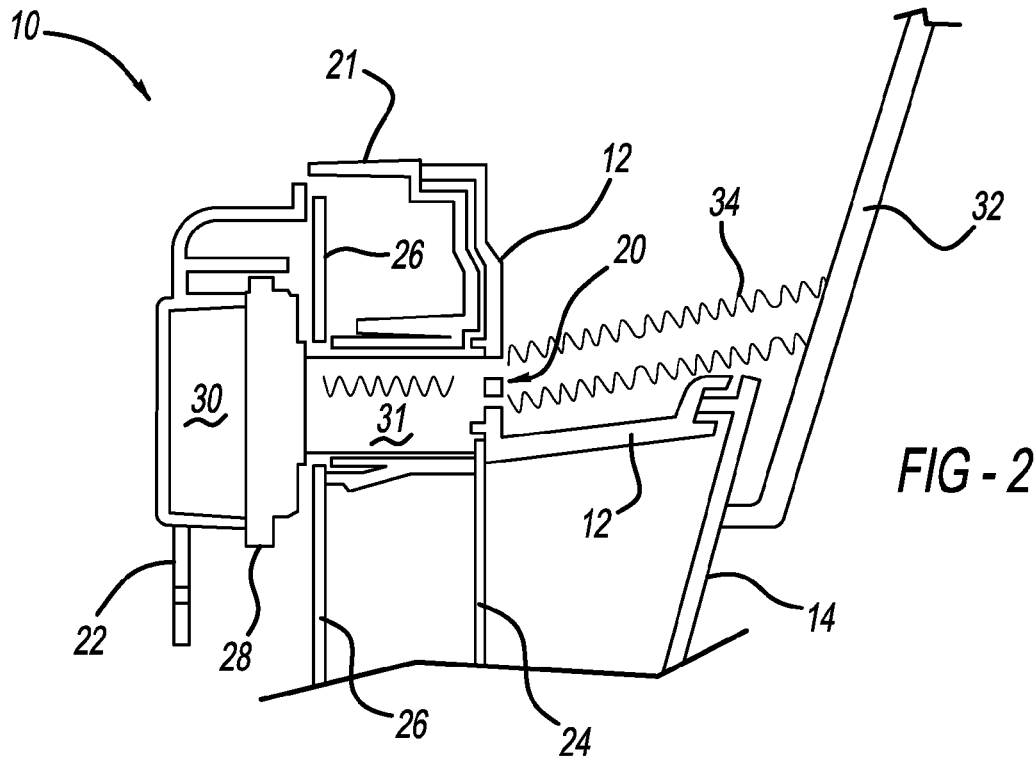
FIG. 2 is a cross-sectional view of the exemplary instrument cluster assembly of FIG. 1 taken along line 2-2.
Figure 3:
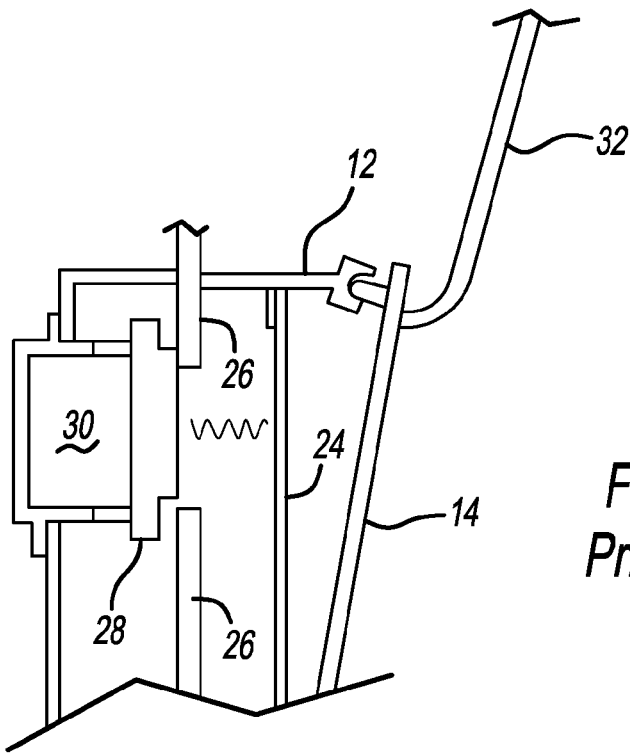
FIG. 3 is a cross sectional view of a conventional instrument cluster assembly.

With reference to FIGS. 1 and 2, an instrument cluster assembly according to the present teachings is generally illustrated at reference numeral 10. The instrument cluster assembly 10 generally includes a case assembly 21, a rear cover 22 attached to a rear side of the case assembly 21, and a mask or visor 12 attached to a front side of the case assembly 21. The instrument cluster assembly 10 also includes a dial sheet 24 and a printed circuit board (PCB) 26 mounted or attached to the case assembly 21. The PCB 26 can include electronics, such as a processor and memory loaded with computer executable instructions, to control and/or generate any indicators or graphical display of the instrument cluster assembly 10. The instrument cluster assembly 10 also includes a lens 14 mounted or attached to the visor 12. The lens 14 may be an acrylic lens 14, suitably transparent to allow the operator of the subject vehicle to view any indicators or graphical displays within the instrument cluster assembly 10.

The instrument cluster assembly 10 may be installed within a subject vehicle. For example, the instrument cluster assembly 10 may be installed within an instrument panel of the subject vehicle such that a bezel 32 of the instrument panel overlaps the lens 14 of the instrument cluster assembly 10 so that the exterior of the visor 12 is hidden from the view of the operator of the subject vehicle.

A graphics display structure for displaying instrument readings of a subject vehicle may be mounted or attached to the PCB 26 and/or located between the PCB 26 and the dial sheet 24. For example, a thin-film-transistor (TFT) liquid-crystal display (LCD) screen may be mounted or attached to the PCB 26 and used for displaying instrument readings of the subject vehicle to an operator of the subject vehicle. For example, the instrument cluster assembly 10 can be used to display instrument readings or any other information pertinent to any suitable vehicle, such as an automobile, motorcycle, watercraft, aircraft, mass transit vehicle, military vehicle, train, construction vehicle, shipping vehicle, etc. For further example, the instrument cluster assembly can also be used to display information relevant to the operation of any type of machinery, such as industrial machinery, including manufacturing equipment, or any type of system, such as a building HVAC system, security system, fire prevention system, etc.

The dial sheet 24 can be any suitable transparent (or semi-transparent) sheet including a display area through which a graphics display structure, such as a TFT LCD screen, can be viewed by an operator of the subject vehicle. The dial sheet 24 may include multiple indicators, which can be illuminated in order to identify various conditions and/or warnings to an operator of the subject vehicle. For example, the indicators may include a speedometer indicator 16 that displays a speed of the subject vehicle and a tachometer indicator 18 that indicates revolutions per minute (RPM) of a motor of the subject vehicle. The indicators can be formed in any suitable manner. For example, the dial sheet 24 can be a clear sheet without pigmentation and with a suitable black ink printed thereon in a manner that outlines the various indicators. Alternatively, the dial sheet 24 can be a smoked polycarbonate (PC) sheet having a smoke/grey tint.

The instrument cluster assembly 10 includes a buzzer or speaker 28 to provide audible alerts and audible feedback to an operator of the subject vehicle. For example, the speaker 28 may output a ticking sound when a turn signal of the vehicle is activated. Additionally, the speaker 28 may output an audible alert, such as a chime or buzzing sound, when another vehicle is located within a blind spot of the subject vehicle. Additionally, the speaker 28 may output an audible alert when the subject vehicle is in reverse and an object is detected by a backup camera system of the subject vehicle.

The speaker 28 may be mounted or attached to the rear cover 22, the case assembly 21, and/or the PCB 26. The speaker 28 may be located behind the PCB 26 such that a front side of the speaker 28 is aligned with an aperture in the PCB 26. A rear side of the speaker 28 may be aligned with a resonance chamber 30 formed in or by the rear cover 22 for amplifying sound waves generated by the speaker 28.

The instrument cluster assembly 10 includes a sound tube 31 that receives sound waves outputted by the speaker 28 and directs the sound waves through the case assembly 21. For example, the sound tube 31 can be formed in or by, or mounted to or within, the case assembly 21. The sound tube 31 is aligned with one or more sound holes 20 formed in the visor 12. The sound tube 31 is also aligned with the aperture in the PCB 26 that is, in turn, aligned with the speaker 28. In this way, sound waves generated and outputted by the speaker 28 are directed by the sound tube 31 to the sound holes 20 formed in the visor 12. In this way, sound waves generated and outputted by the speaker 28 can travel unimpeded from the speaker 28 through the sound tube 31 within the case assembly 21 and exit the instrument cluster assembly 10 through the holes 20 formed in the visor 12. Additionally, if any additional structures or materials are present within the instrument cluster assembly 10 between the speaker 28 and sound holes 20, such materials can include appropriate apertures to accommodate the sound tube 31 and allow for the sound waves generated by the speaker to travel unimpeded through the sound tube 31 to the sound holes 20 in the visor 12. The sound waves 34 exiting the instrument cluster assembly 10 through the sound holes 20 of the visor 12 travel through the bezel 32 of the instrument panel to the operator of the vehicle. Because the bezel 32 of the instrument panel overlaps the lens 14, the sound holes 20 of the visor 12 remain hidden from the view of the operator of the subject vehicle.

As such, sound waves generated and outputted by the speaker 28 are outputted from the instrument cluster assembly 10 through the sound holes 20 without having to pass through the internal structures or materials of the instrument cluster assembly 10, such as the dial sheet 24 or the lens 14. As compared with the conventional instrument cluster assembly, the sound waves generated by the speaker 28 of the instrument cluster assembly 10 are not subject to attenuation by dampening, muting, and muffling due to the internal structures of the instrument cluster assembly 10 before reaching the operator of the subject vehicle. For example, sound waves 34 generated by the speaker 28 and exiting the instrument cluster assembly 10 via the sound holes 20 of the visor 12 need only travel through the bezel 32 of the instrument panel to reach the operator of the subject vehicle, whereas sounds waves generated by the speaker 28 in the conventional instrument cluster assembly must pass through the dial sheet 24, the lens 14, and any other internal structure of the conventional instrument cluster assembly, as necessary, before reaching the operator of the vehicle. As such, the speaker 28 of the instrument cluster assembly 10 can be operated at a lower volume, as compared with a speaker in a conventional instrument cluster assembly, as it is not necessary to increase the volume to offset attenuation caused by internal structures of the instrument cluster assembly 10, such as the dial sheet 24 and the lens 14, as is the case in the conventional instrument cluster assembly.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An instrument cluster assembly comprising:
   a case assembly having a visor attached to a front side of the case assembly, the visor having at least one sound hole;
   a dial sheet mounted within the case assembly, the dial sheet having at least one indicator;
   a lens mounted to the visor such that the at least one indicator of the dial sheet is viewable through the lens;
   a speaker mounted within the instrument cluster assembly that generates sound waves;
   a sound tube within the instrument cluster assembly that directs the sound waves from the speaker to the at least one sound hole of the visor such that sound waves generated by the speaker travel through the sound tube and exit the at least one sound hole of the visor without traveling through the dial sheet and the lens; and
   a printed circuit board mounted within the instrument cluster assembly, the printed circuit board including electronics that control a graphical display of the instrument cluster assembly;
   wherein the printed circuit board includes an aperture that is aligned with the sound tube and aligned with the speaker.

2. The instrument cluster assembly of claim 1, wherein the sound tube is formed by the case assembly.

3. The instrument cluster assembly of claim 1, wherein the speaker is mounted to the printed circuit board.

4. The instrument cluster assembly of claim 1, wherein the speaker is mounted to the case assembly.

5. The instrument cluster assembly of claim 1, further comprising:
   a rear cover attached to a rear side of the case assembly, the rear cover including a resonance chamber that amplifies the sound waves generated by the speaker.

6. The instrument cluster assembly of claim 1, wherein the at least one sound hole of the visor is hidden from view when by a bezel of an instrument panel when the instrument cluster assembly is installed in the instrument panel.

7. An instrument panel comprising:
   a bezel; and
   the instrument cluster assembly of claim 1;
   wherein the bezel of the instrument panel overlaps the lens of the instrument cluster assembly such that the at least one sound hole of the visor is hidden from view by the bezel and the sound waves exiting the at least one sound hole travel through the bezel.

8. An instrument cluster assembly comprising:
   a case assembly having a visor attached to a front side of the case assembly, the visor having at least one sound hole;
   a dial sheet mounted within the case assembly, the dial sheet having at least one indicator;
   a lens mounted to the visor such that the at least one indicator of the dial sheet is viewable through the lens;
   a speaker mounted within the instrument cluster assembly that generates sound waves;
   a sound tube within the instrument cluster assembly that directs the sound waves from the speaker to the at least one sound hole of the visor such that sound waves generated by the speaker travel through the sound tube and exit the at least one sound hole of the visor without traveling through the dial sheet and the lens;
   wherein the at least one sound hole of the visor is hidden from view by a bezel of an instrument panel when the instrument cluster assembly is installed in the instrument panel.

* * * * *